(12) United States Patent
Ioffe et al.

(10) Patent No.: US 9,311,310 B2
(45) Date of Patent: Apr. 12, 2016

(54) SYSTEM AND METHOD FOR GROUPING RELATED PHOTOGRAPHS

(71) Applicant: GOOGLE INC., Mountain View, CA (US)

(72) Inventors: Sergey Ioffe, Mountain View, CA (US); Vivek Kwatra, Santa Clara, CA (US); Matthias Grundmann, Atlanta, GA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/661,425

(22) Filed: Oct. 26, 2012

(65) Prior Publication Data

US 2014/0118390 A1   May 1, 2014

(51) Int. Cl.
*G09G 5/00* (2006.01)
*G06F 17/30* (2006.01)

(52) U.S. Cl.
CPC .... *G06F 17/30056* (2013.01); *G06F 17/30265* (2013.01)

(58) Field of Classification Search
USPC .......................................................... 345/619
See application file for complete search history.

(56) References Cited

U.S. PATENT DOCUMENTS

| | | | |
|---|---|---|---|
| 7,812,998 B2 * | 10/2010 | Miers | 358/1.18 |
| 7,917,859 B1 * | 3/2011 | Singh et al. | 715/763 |
| 8,730,397 B1 * | 5/2014 | Zhang | 348/583 |
| 2003/0214128 A1 * | 11/2003 | Roberts et al. | 281/31 |
| 2006/0112080 A1 * | 5/2006 | Chen et al. | 707/3 |
| 2006/0287105 A1 | 12/2006 | Willis | |
| 2008/0144135 A1 * | 6/2008 | Miers | 358/500 |
| 2008/0184139 A1 * | 7/2008 | Stewart et al. | 715/762 |
| 2008/0189175 A1 | 8/2008 | Chan | |
| 2009/0248692 A1 * | 10/2009 | Tsukagoshi et al. | 707/9 |
| 2009/0248703 A1 * | 10/2009 | Tsukagoshi et al. | 707/10 |
| 2010/0169389 A1 | 7/2010 | Weber et al. | |
| 2010/0241945 A1 * | 9/2010 | Chen et al. | 715/230 |
| 2010/0315664 A1 * | 12/2010 | Miers | 358/1.12 |
| 2011/0080424 A1 | 4/2011 | Peters et al. | |
| 2011/0214077 A1 * | 9/2011 | Singh et al. | 715/762 |
| 2011/0295667 A1 | 12/2011 | Butler | |
| 2012/0007995 A1 * | 1/2012 | Barrett | 348/207.1 |
| 2012/0082378 A1 | 4/2012 | Peters et al. | |
| 2012/0092685 A1 * | 4/2012 | Barrett | 358/1.6 |
| 2012/0122554 A1 | 5/2012 | Paquet et al. | |
| 2012/0214568 A1 | 8/2012 | Herrmann | |

OTHER PUBLICATIONS

ISR and the Written Opinion of the International Search Authority mailed Jan. 29, 2014 in related application PCT/US2013/066414.

* cited by examiner

*Primary Examiner* — M Good Johnson (57) ABSTRACT

A computer-implemented method, computer program product, and computing system is provided for interacting with images having similar content. In an embodiment, a method may include identifying a plurality of photographs as including a common characteristic. The method may also include generating a flipbook media item including the plurality of photographs. The method may further include associating one or more interactive control features with the flipbook media item.

20 Claims, 6 Drawing Sheets

SYSTEM AND METHOD FOR GROUPING RELATED PHOTOGRAPHS

TECHNICAL FIELD

This disclosure relates to digital photographs and, more particularly, to interacting with groups of photographs.

BACKGROUND

The use of digital photography has become an important part of daily life for many individuals. Many cellular phones now include cameras and many social networking application facilitate the sharing of digital photos among many individuals and social groups. Not only has digital photography increased the ease with which photos may be shared by individuals, but the combination of digital cameras being incorporated into common every-day items, such as cellular phones, and the low relative cost of digital photography, due at least in part to the elimination of film and developing costs, have increased the number of pictures that people take. People may often take pictures of events, items, settings, or the like, that they likely would not have if they had to pay for film and developing of the pictures. Similarly, people may often take many pictures of the same scene or subject with the intent of picking the best picture at a later date.

SUMMARY OF DISCLOSURE

According to an implementation, a method may include identifying a plurality of photographs as including a common characteristic. The method may also include generating a flipbook media item including the plurality of photographs. The method may also include associating a representative photograph with a visual indicator of the flipbook media item. The method may further include associating one or more interactive control features with the flipbook media item for manually navigating the plurality of photographs.

According to another implementation, a method may include identifying a plurality of photographs as including a common characteristic. The method may also include generating a flipbook media item including the plurality of photographs. The method may further include associating one or more interactive control features with the flipbook media item.

One or more of the following features may be included. The common characteristic may include inclusion of the plurality of photographs in a photo burst. The common characteristic may include a visual similarity between the plurality of photographs.

Generating the flipbook media item may include associating the plurality of photographs based on one of a time-wise sequence and a spatial alignment sequence. Generating the flipbook media item may include associating one of the plurality of photographs as a representative photograph displayed in a visual indicator of the flipbook media item. The method may also include receiving a user indication of a photograph, and associating the one of the plurality of photographs as the representative photograph based on the user indication. The one or more interactive control features may include controls for one or more of automatically and manually navigating the plurality of photographs included within the flipbook media item.

The method may further including aligning at least a portion of a first photograph of the plurality of photographs with at least a portion of an adjacent photograph of the plurality of photographs during navigation between the first photograph and the adjacent photograph within the flipbook media item. Aligning at least a portion of the first photograph with at least a portion of an adjacent photograph may include image stabilizing the adjacent photograph with respect to the first photograph. Aligning at least a portion of the first photograph with at least a portion of the adjacent photograph may include cropping one or more of the first photograph and the second photograph during navigation between the first photograph and the adjacent photograph within the flipbook media item.

According to another implementation, a computing system may include at least one processor. The at least one processor may be configured to identify a plurality of photographs as including a common characteristic. The at least one processor may also be configured to generate a flipbook media item including the plurality of photographs. The at least one processor may further be configured to associate one or more interactive control features with the flipbook media item.

One or more of the following features may be included. The common characteristic may include inclusion of the plurality of photographs in a photo burst. The common characteristic may include a visual similarity between the plurality of photographs.

The at least one processor configured to generate the flipbook media item may be configured to associate the plurality of photographs based on one of a time-wise sequence and a spatial alignment sequence. The at least one processor configured to generate the flipbook media item may be configured to associate one of the plurality of photographs as a representative photograph displayed in a visual indicator of the flipbook media item. The at least one processor may be further configured to receive a user indication of a photograph, and to associate the one of the plurality of photographs as the representative photograph based on the user indication. The one or more interactive control features may include controls for one or more of automatically and manually navigating the plurality of photographs included within the flipbook media item.

The at least one processor may be further configured to align at least a portion of a first photograph of the plurality of photographs with at least a portion of an adjacent photograph of the plurality of photographs during navigation between the first photograph and the adjacent photograph within the flipbook media item. The at least one processor configured to align at least a portion of the first photograph with at least a portion of an adjacent photograph may be configured to image stabilize the adjacent photograph with respect to the first photograph. The at least one processor configured to align at least a portion of the first photograph with at least a portion of the adjacent photograph may be configured to crop one or more of the first photograph and the second photograph during navigation between the first photograph and the adjacent photograph within the flipbook media item.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF EXAMPLE EMBODIMENTS

According to some example embodiments, a user may have a group of photographs (e.g., digital images) that may include various similarities. For example, each of the photographs in the group may depict a common or related scene, subject or event. Such a group of photographs may, for example, result from a photo burst (e.g., multiple photographs being taken within a relatively short period of time) or an attempt to document a scene or event, capture "the right moment," or to ensure that a useable photograph or photograph of desirable quality (e.g., in focus, with a person in the photograph smiling or not blinking, etc.). Groups of photographs having some degree of similarity may occur in various other ways. Such a group of photographs may include a relatively large degree of similarity. In some embodiments, the similarities between the individual photographs in the group may make viewing the entire group of photographs uninteresting, overwhelming, or challenging, for example because the differences between the photographs may be less apparent than the similarities. Therefore, it may be difficult for some viewers to appreciate the differences in content, information, or artistic or aesthetic value provided by each of the individual photographs, or may simply be uninteresting for some viewers to consume each of the individual photographs.

In some example embodiments, the individual photographs may be identified as belonging to a group including some common characteristic (such as a similarity in content, belonging to a common photo burst, etc.). A flipbook media item may be generated based on the group of photographs. In some example embodiments the flipbook media item may allow a viewer to interact with the group of photographs as a single media item that may allow the viewer to navigate the individual photographs of the group in a manner that may be convenient and may allow the viewer to better appreciate the differences between the photographs of the group and/or to better consume, evaluate, and/or appreciate individual photographs within the group without becoming overwhelm or confused by the similarities that may exist between the photographs of the group.

Figure 1:
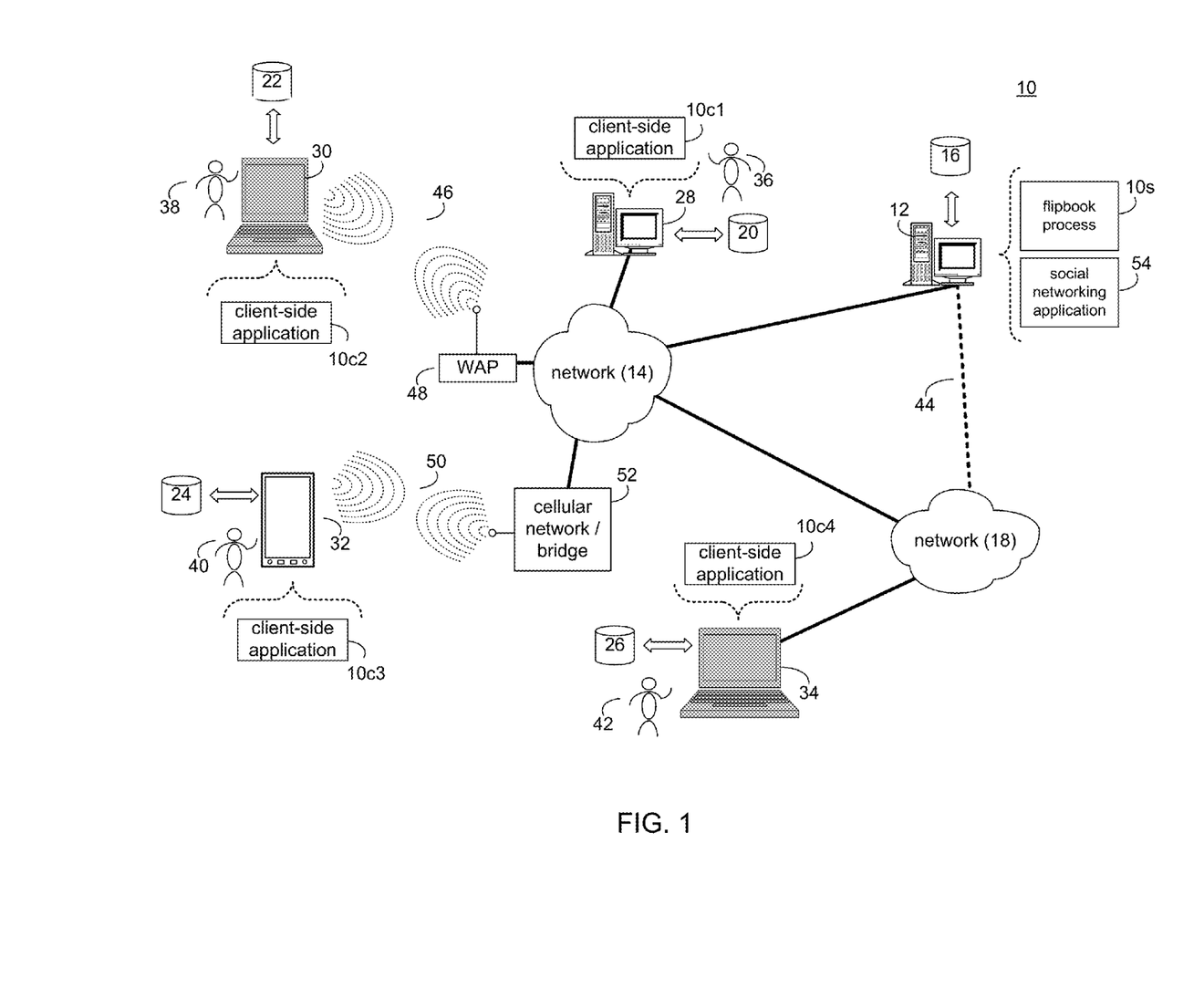
FIG. 1 is a diagrammatic view of a distributed computing network including a computing device that executes flipbook process according to an embodiment of the present disclosure.

Referring to FIG. 1, there is shown flipbook process 10. For the following discussion, it is intended to be understood that flipbook process 10 may be implemented in a variety of ways. For example, flipbook process 10 may be implemented as a server-side process, a client-side process, or a server-side/client-side process.

For example, flipbook process 10 may be implemented as a purely server-side process via flipbook process 10s. Alternatively, flipbook process 10 may be implemented as a purely client-side process via one or more of client-side application 10c1, client-side application 10c2, client-side application 10c3, and client-side application 10c4. Alternatively still, flipbook process 10 may be implemented as a server-side/client-side process via flipbook process 10s in combination with one or more of client-side application 10c1, client-side application 10c2, client-side application 10c3, and client-side application 10c4. In such an example, at least a portion of the functionality of flipbook process 10 may be performed by flipbook process 10s and at least a portion of the functionality of flipbook process 10 may be performed by one or more of client-side application 10c1, 10c2, 10c3, and 10c3.

Accordingly, flipbook process 10 as used in this disclosure may include any combination of flipbook process 10s, client-side application 10c1, client-side application 10c2, client-side application 10c3, and client-side application 10c4.

Figure 2:
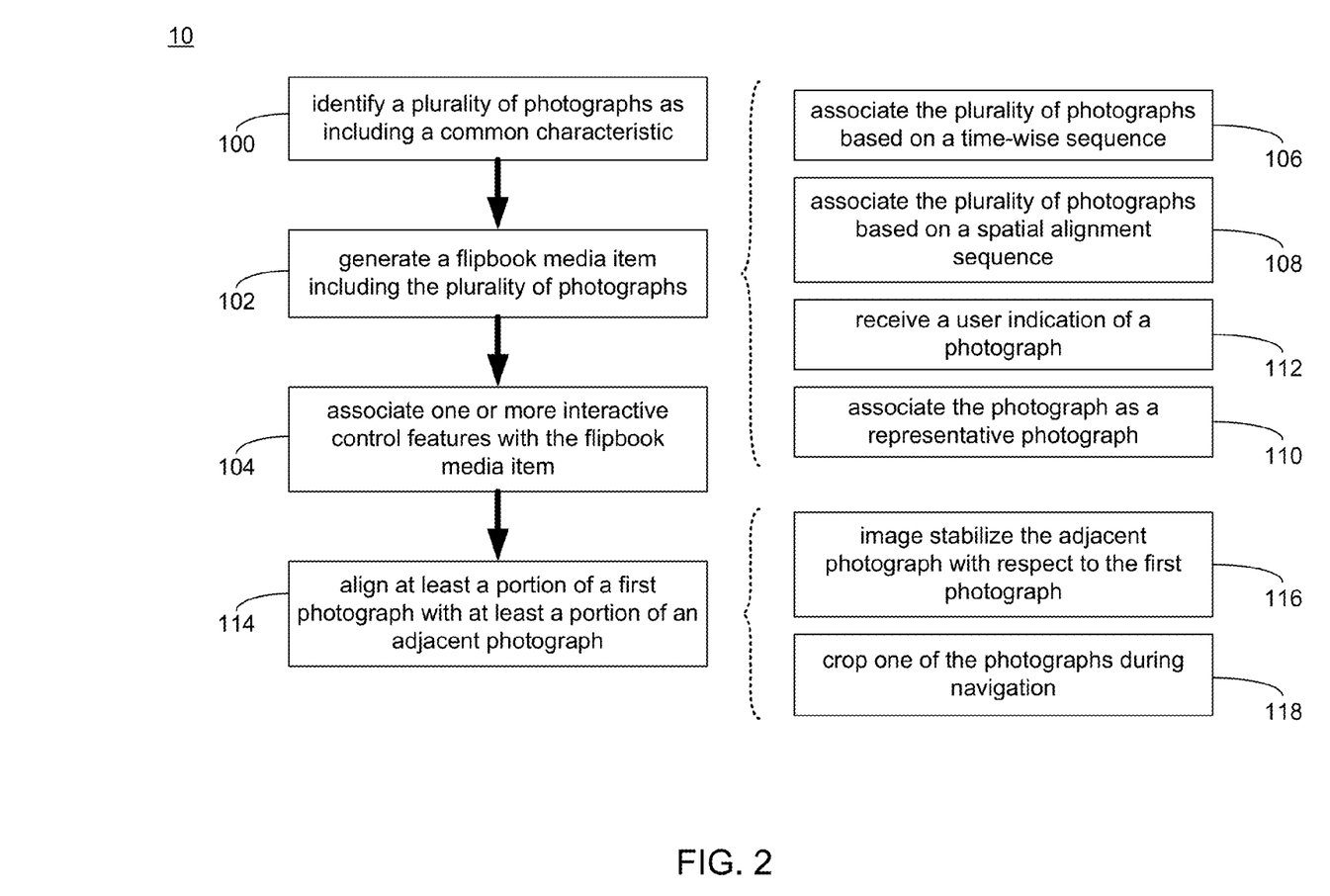
FIG. 2 is a flowchart of the flipbook process of FIG. 1, according to an embodiment of the present disclosure.

Referring also to FIG. 2 and as will be discussed below in greater detail, flipbook process 10 may identify 100 a plurality of photographs as including a common characteristic. Flipbook process 10 may also generate 102 a flipbook media item including the plurality of photographs. Flipbook process 10 may further associate 104 one or more interactive control features with the flipbook media item.

Flipbook process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of flipbook process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a photo album, a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

In one or more implementations in which flipbook process 10 may include a server-side process and/or a hybrid server-side/client-side process, users 36, 38, 40, 42 may access flipbook process 10 directly through network 14 or through secondary network 18. Further, flipbook process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channel 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

As generally discussed above, flipbook process 10 may generally allow a user to manage and interact with groups of photographs (e.g., digital images). The groups of photographs may include photographs that include common characteristics, are near duplicates, or are otherwise similar to one another. The photographs in the group may include a common characteristic or similarity that may make it difficult to discern differences between the photographs, may be overwhelming, and/or may be uninteresting to some users because of the similarities between the photographs. However, the individual photographs in the group and/or the aggregate group of photographs itself may represent information, content, or artistic or aesthetic expression that may not necessarily be fully captured by any single photograph in the group. According to various embodiments, flipbook process 10 may allow the group of photographs to be managed and interacted with in a manner that may allow the information, content, or expression embodied in the group of photographs to retained and/or realized or appreciated that may be relatively easier than managing the group of photographs as individual photographs and may result in less confusion or perceptional overload for the user.

According to an embodiment, flipbook process 10 may identify 100 a plurality of photographs as including a common characteristic. Flipbook process 10 may also generate 102 a flipbook media item including the plurality of photographs. Flipbook process 10 may further associate 104 one or more interactive control features with the flipbook media item.

Figure 3:
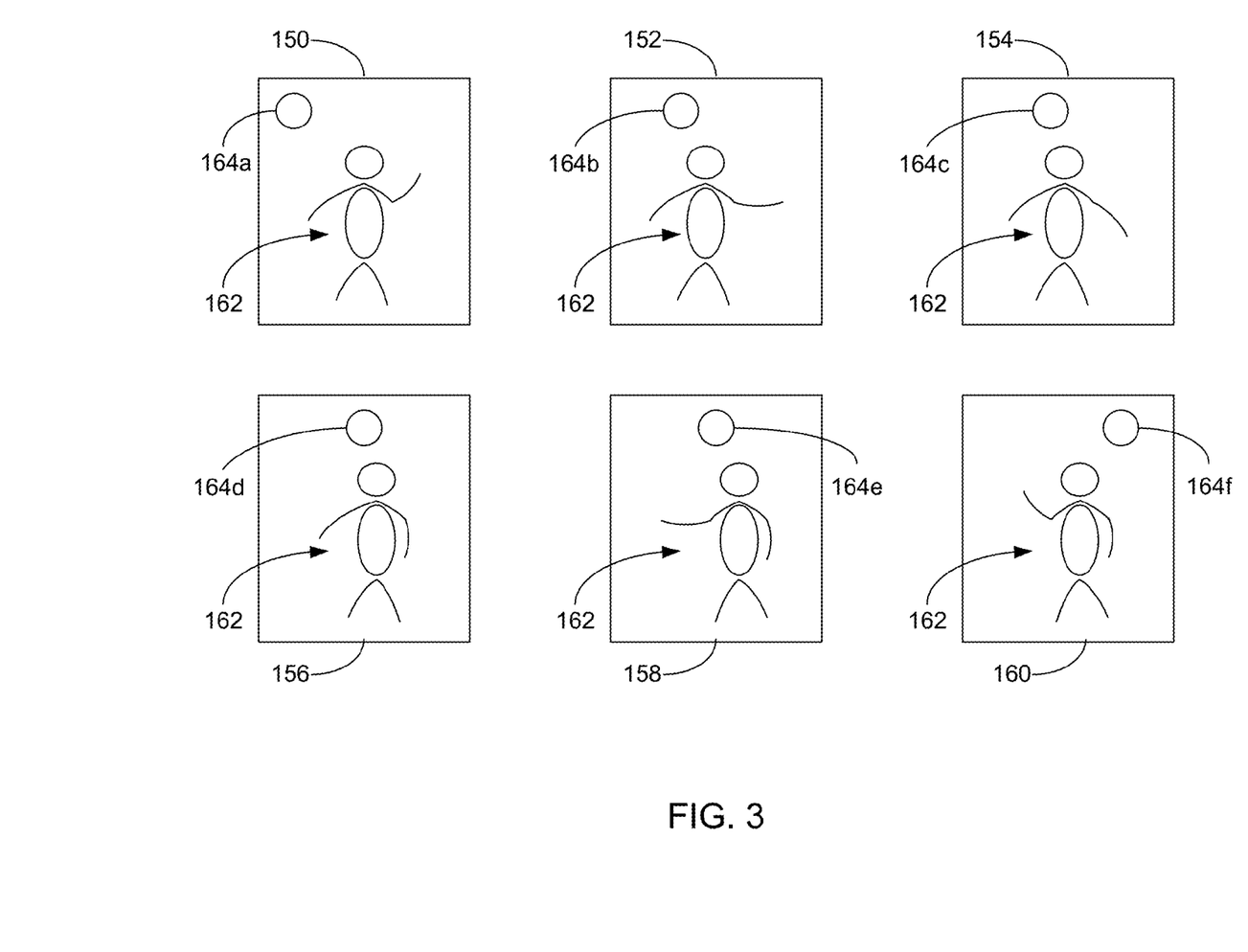
FIG. 3 is diagrammatic representation of a plurality of digital photographs that may be utilized in connection with the flipbook process of FIG. 1, according to an embodiment of the present disclosure.

For example, and referring also to FIG. 3, flipbook process 10 may identify 100 a plurality of photographs (e.g., photographs 150, 152, 154, 156, 158, 160) as including a common characteristic. For example, and as generally discussed above, in some instances a user (e.g., user 40 of mobile computing device 32) may take more than one photograph of a given scene, subject, or event, as generally depicted in example photographs 150-160 in FIG. 3. For example, user 40 may be attempting to capture a moment in a group picture in which all of the members of the group picture are smiling and/or not blinking. Similarly, user 40 may take multiple pictures of an event, such as a child riding a bicycle, in an attempt to capture details of the moment or to get at least one photograph that is in focus and desirably composed. In a further example, user 40 may take multiple photographs of a scene that may be larger than the field of view of the camera (e.g., which may include a camera and/or camera functionality incorporated into mobile computing device 32) in an attempt to capture a panoramic view of the scene. Various additional/alternative situations will be understood in which user 40 take multiple picture that may include a common characteristic. According to an embodiment, flipbook process 10 may identify 100 the plurality of photographs as including a common characteristic.

In an example embodiment, the common characteristic by which flipbook process 10 may identify the plurality of photographs may include inclusion of the plurality of photographs in a photo burst. That is, the common characteristic of the group of photographs may indicate that the pictures were taken by the same device and within a relatively short period of time, e.g., which may indicate that the photographs were taken as a burst, and/or otherwise taken in a manner to capture a given scene, subject, or the like. In one such example, each of the photographs may include an associated device identifier of the camera, cellular phone, etc., that was used to take the picture. Each of the photographs may also include a time stamp, indicating a time at which each picture was taken. For example, the device identifier and/or the time stamp may be included as metadata associated with each of the photographs. In such an embodiment, a group of pictures taken by the same camera within a thirty second (for example) time period may indicate a burst of photographs that may have been taken to capture the same, or similar, subject, scene, or event. The time period during which the plurality of photographs were taken may vary depending upon, for example, default settings and/or user preference. Further, in some embodiments, the time period may define a time period during which the entire group of photographs were taken. In another embodiment, the time period may define a maximum time period between any two consecutive photographs in order for the photographs to be identified 100 as including a common characteristic.

In an embodiment, the common characteristic may include a visual similarity between the plurality of photographs. For example, flipbook process 10 may identify 100 the plurality of photographs as including a common characteristic which may include a visual similarity between the plurality of photographs, in which identifying the visual similarity may include executing image processing and/or analysis on the plurality of photographs. For example, image analysis may identify the group of pictures as including a common characteristic based on a comparison of color and/or texture histograms associated with each of the photographs. In some embodiments, image analysis of the plurality of photographs may include geometric analysis (e.g., identification of transformations between the images). In some embodiments, image analysis of the plurality of photographs may include facial recognition of one or more people included within the plurality of photographs (e.g., which may identify one or more common subjects of the photographs). In an example embodiment, image analysis of the plurality of photographs may include analyzing spatial alignment of features included within each of the photographs (e.g., which may indicate an at least partial overlap of contents of each photograph). In some embodiments, analyzing spatial alignment of features included within each of the plurality of photographs may include a similar approach used in image stabilization techniques (e.g., such as may be used to stabilize video media). Other methods may be utilized for identifying 100 the group of photographs as including a common characteristic (e.g., based on tags associated with the plurality of photographs, etc.).

Flipbook process 10 may also generate 102 a flipbook media item including the plurality of photographs. In an embodiment, the flipbook media item may include a first-class item that may, for example, have an identity distinct from the photographs that it includes. As such, the flipbook media item may be a self-contained item that includes the group of photographs and information about the photographs. In some embodiments, the flipbook media item (which includes the group of photographs) may be represented by a single icon, etc., for example, within a photo album (e.g., which may be generated by a media management application, that may allow user 40 to access media items such as digital images, digital video files, and the like). For example, and referring also to FIG. 4, a photo alum user interface (e.g., user interface 200) may include a plurality of media items, such as flipbook media item 202 (e.g., which may be generated 102 flipbook process 10 based on, at least in part, photographs 150-160) as well as various additional digital images (e.g., digital images 204, 206, 208, 210, 212, 214).

In an embodiment, flipbook process 10 may generate 102 a flipbook media item including all of the photographs identified 100 as including a common characteristic. In some embodiments, flipbook process 10 may utilize image quality assessment and may generate 102 the flipbook media item including only selected photographs identified as including a common characteristic and that have an image quality above a threshold image quality. An example of quality assessment may include blur analysis to detect frames or photographs having a reduced contrast (e.g., based on, at least in part, a reduced average gradient magnitude) in a local temporal neighborhood. Another example of quality assessment may include exposure analysis, which may detect dark frames (e.g., based on, at least in part, histogram analysis) in a local temporal neighborhood. Another example of quality assessment may include alignment analysis to identify photographs having relatively small (or no) differences within a local temporal neighborhood. In some embodiments, flipbook process 10 may generate 102 the flipbook media item not including photographs that do not have an image quality above the threshold (e.g., photographs having an image quality lower than the threshold may not be included in the flipbook media item).

Generating 102 the flipbook media item may include associating the plurality of photographs based on one of a time-wise sequence 106 and a spatial alignment sequence 108. For example, the plurality of digital photographs included within the flipbook media item may include associated metadata, which may include a timestamp indicating a time at which each respective digital photograph was taken. Associating 106 the plurality of digital photographs based on, at least in part, a time-wise sequence may include arranging the plurality of digital photographs in a chronological order, e.g., by which each successive digital photograph in the arrangement may have been taken at a later time than the preceding digital photograph. For example, in an embodiment in which the plurality of digital photograph may be the result of a photo burst each of the plurality of digital photographs may have been taken one after another in a particular time-wise sequence. Associating 106 the plurality of digital photographs in a time-wise sequence may arrange the digital photographs in the order in which they were taken. When the plurality of digital photographs are arranged in the time-wise sequence in which they were taken, the flipbook media item so generated 102 by flipbook process 10 may convey time-wise differences between the plurality of photographs.

Generating 102 the flipbook media item may include associating 108 the plurality of photographs based on, at least in part, a spatial alignment sequence. Associating 108 the plurality of digital photographs based on, at least in part, a spatial alignment sequence may include executing image processing or analysis across the plurality of digital photographs, e.g., to determine a pattern associated with variations between the plurality of digital photographs. Associating 108 the plurality of photographs based on, at least in part, a spatial alignment sequence may include, for example, arranging the plurality of photographs in a sequence by which adjacent photographs in the sequence may include a minimum transformation relative to one another (e.g., as opposed to a transformation between two non-adjacent photographs in the sequence). For example, and by reference to FIG. 3, digital photographs 150-160 may each include subject 162, whose arm positions may vary in each of digital photograph 150-160 relative to one another. Digital photograph 150-160 may also include a background object (164) which may move (e.g., in a generally left to right direction) between 164*a*, 164*b*, 164*c*, 164*d*, 164*e*, and 164*f* in respective photographs 150-160. In an embodiment, generating the flip book media item including associating 108 the plurality of photographs based on, at least in part, a spatial alignment sequence may include arranging the plurality of photographs to establish a pattern of change (e.g., movement of the arms of subject 162 and/or position of background object 164) between the plurality of digital photographs, such as generally depicted by the illustrated arrangement of photographs 150-160 in FIG. 3. Determining a minimum transformation between the plurality of digital photographs and/or associating 108 the plurality of digital photographs based on a spatial alignment sequence to having a minimum transformation between adjacent photographs in the sequence may include, for example, providing a minimum difference in arm position of subject 162 between adjacent photographs in the sequence, minimum relative movement of background object 164 between adjacent photographs in the sequence, and/or both minimum difference in arm position and minimum relative movement of background object 164.

Figure 4:
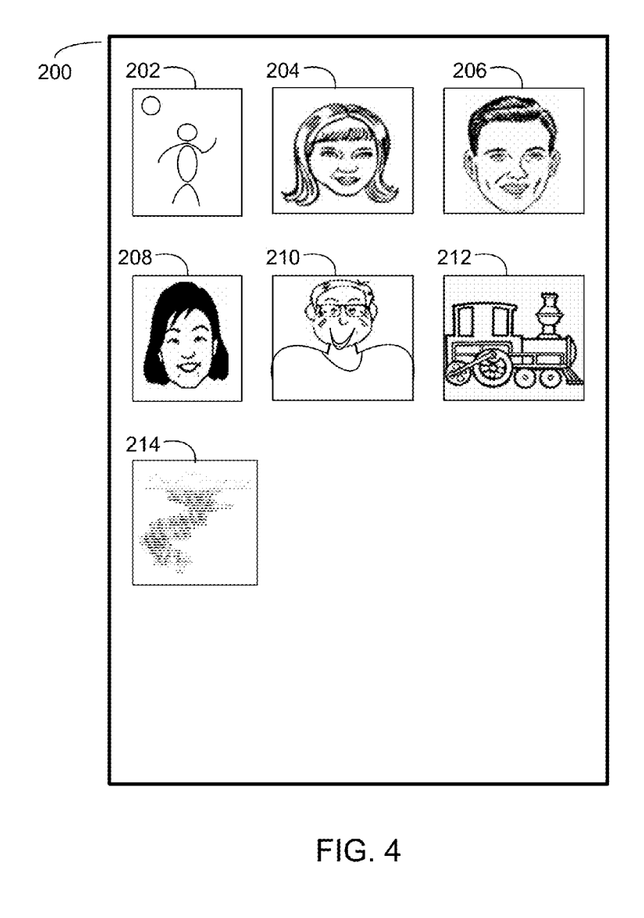
FIG. 4 is a diagrammatic representation of a user interface that may be generated, at least in part, by the flipbook process of FIG. 1, according to an embodiment of the present disclosure

Generating 102 the flipbook media item may include associating 110 one of the plurality of photographs as a representative photograph displayed in a visual indicator of the flipbook media item. As generally described above, the flipbook may be based on, at least in part, a commonality between the photographs (e.g., in terms of a common subject, scene, event, or the like) rather than just random group of photographs. That is, the flipbook may be predicated on a connection and common aspect between the photographs. A representative photograph may be indicative of the subject matter and/or commonality of the plurality of photographs. For example, as shown in FIG. 4, flipbook media item 202 may be represented in a user interface (e.g., in photo album user interface 200, or other user interface) by an image that may be indicative of the subject matter of the flipbook media item. As such, a user accessing user interface 200 may be able to generally discern the contents of flipbook media item 202 based on the representative photograph displayed in the visual indicator of flipbook media item 202. The representative photograph may be selected, for example, from the group of photographs included within the flipbook media item. Flipbook process 10 may automatically associate 110 a representative photograph with flipbook media item 202, for example utilizing a first digital photograph included within flipbook media item 202, utilizing a photograph having a highest relative quality (e.g., based on image analysis which may indicate characteristics such as exposure, how light or dark the image is, how blurry the image is, etc.). Further, in some embodiments, flipbook process 10 may receive 112 a user indication of a photograph. For example, from a display of the individual photographs to be included in the flipbook media item, a display that sequentially presents the individual photographs of the flipbook media item, or other suitable display, a user (e.g., user 40) may select (e.g., using a pointing device such as a mouse, a touch screen interface, or other suitable selecting device) a desired representative photograph. Flipbook process 10 may receive 112 the user selection of a representative photograph, and may associating 110 the selected photograph as the representative photograph based on the user indication.

As generally described above, the flipbook media item may include a collection of photographs that may be treated as a single media item. The images included within the flipbook media item may be connected to one another based on, at least in part, a (not just physical/data link, but flipbook indicates a commonality between the photographs (e.g., in terms of a common subject, scene, event, or the like). In addition to connecting the plurality of photographs based on, at least in part, the commonality between the photographs, flipbook process 10 may associate 104 one or more interactive control features with the flipbook media item. The one or more interactive control features associated with the flipbook media item may, for example, allow a user to consume the flipbook media item in a manner that may allow the user to view the photographs included in the flipbook individually and/or in the context of a sequence of related photographs. As such, flipbook media item 202 may allow a user to better appreciate the commonalities and differences between the related photographs of flipbook media item 202. As such, in some instances the navigation control features associated with flipbook media item 202 may allow a user to appreciate the full information contained within the plurality of photographs as a group as well as in the context of individual photos.

The one or more interactive control features may include controls for one or more of automatically and manually navigating the plurality of photographs included within the flipbook media item. For example, and referring also to FIG. 5, an example of interactive controls (e.g., interactive controls 250, generally) may allow a user to manually navigate through the photographs included within the flipbook, and/or to automatically play through the photographs included within the flipbook. It should be noted that flipbook media item 202 is shown in an expanded form (e.g., sized to fill a substantial portion of the display) in user interface 200 within FIG. 5. However, such a possible configuration is intended for illustrative clarity and, while possible, is not intended to be a limitation of the present disclosure as interactive controls may be invoked when flipbook media item 202 is in an expanded form, a full screen form, or the original thumbnail form shown in FIG. 4 (as well as various other sizing configurations). In an example embodiment, flipbook media item 202 may be expanded (e.g., from the thumbnail form depicted in FIG. 4) in response to user 40 selecting thumbnail flipbook media item 202 (e.g., touching the thumbnail flipbook media item 202 display on a touch screen user interface display of mobile computing device 32, or via other suitable user interface device). Further, in an embodiment, the interactive controls may be an embedded features of the flipbook, e.g., which may be exposed when a user selects the flipbook media item (whether such selection is configured to expand the display of the flipbook media item or not).

Figure 5:
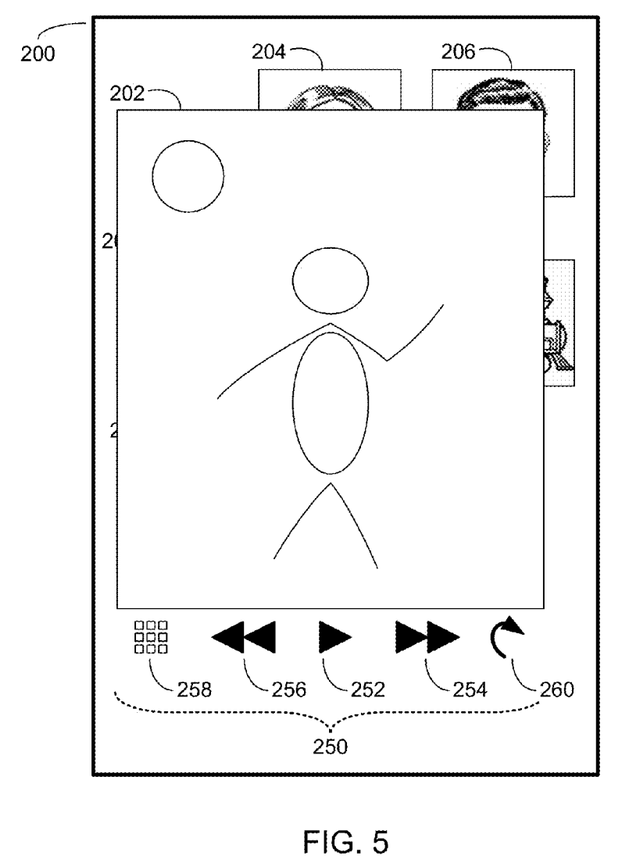
FIG. 5 is a diagrammatic representation of a user interface that may be generated, at least in part, by the flipbook process of FIG. 1, according to an embodiment, of the present disclosure.

As shown in the illustrative embodiment, interactive controls may include automatic navigation control 252. In response to user 40 selecting automatic navigation control 252, flipbook process 10 may automatically display the sequence of digital photographs include within flipbook media item 202. For example, flipbook process may sequentially display each of digital photographs 150-160 for a predetermined time interval before displaying the next digital photograph in the sequence. In some embodiments, the time interval for which each digital photograph is displayed may be adjusted, e.g., based on system settings and/or user preferences. As such, flipbook process 10 may navigate through the plurality of digital photographs in a relatively rapid manner, e.g., which may generally approximate an animation of the sequence of photographs. Further, flipbook process 10 may also/alternatively navigate through the plurality of digital photographs in a relatively slow manner, e.g., which may allow more extended and/or thorough examination of each individual digital photograph 150-160. Interactive controls 250 may further include functionality that may allow a user to manually navigate through digital photographs 150-160 included within flipbook media item 202. For example, user 40 may manually navigate to a next digital photograph in the sequence of photographs included within flipbook media item 202 by selecting forward navigation control 254. In a generally corresponding manner, user 40 may manually navigate to the previous digital photograph in the sequence of photographs include within flipbook media item 202 by selecting backwards navigation control 256. Utilizing forward navigation control 254 and backwards navigation control 256 user 40 may manually navigate though digital photographs 150-160 included within flipbook media item 202, for example, and also control the rate (e.g., display interval) for each digital photograph. Further, in an embodiment user 40 may select array navigation control 258, e.g., which may result in flipbook process 10 displaying plurality of digital photographs 150-160 included within flipbook media item 202 in an array of separate photos. Consistent with the foregoing, in some embodiments the interactive controls may allow a user to display and navigate the plurality of photographs in a manner that may not be overwhelming to the user (e.g., which may result from being confronted with multiple photographs that are similar to one another). Further, by retaining all of the photographs within the flipbook media item, the diversity of information represented by the plurality of digital photographs may be preserved.

In an embodiment, flipbook process 10 may display the plurality of digital photographs (e.g., in response to selection of automatic or manual navigation controls) including aligning 114 at least a portion of a first photograph of the plurality of photographs with at least a portion of an adjacent photograph of the plurality of photographs during navigation between the first photograph and the adjacent photograph within the flipbook media item. In an embodiment, aligning 114 at least a portion of the first photograph with at least a portion of an adjacent photograph may include image stabilizing 116 the adjacent photograph with respect to the first photograph. For example, in the case of a plurality of digital photographs taken of the same subject, even when the subject and/or the photographer remain in the same position for each of the plurality of photographs very slight, or even more signification, changes in photographic alignment may occurs due to slight changes in angles, positions, camera movement, and the like. Flipbook process 10 may image stabilize 116 the digital photographs (and/or a portion of the digital photographs) included within the flipbook media item with respect to one another (e.g., during navigation between and/or amongst the photographs included within the flipbook media item). Image stabilizing 116 the digital photographs (e.g., utilizing image stabilization techniques such as may be employed for video image stabilization, or other image stabilizing techniques) may, in some instances, make it easier for a user to appreciate the differences and/or similarities between the various digital photographs included within the flipbook media item. For example, the user's attention may not be distracted by slight movement of the camera between photographs, and may, for example, allow changed elements between photographs to appear visually more dynamic and more apparent.

Aligning 114 at least a portion of the first photograph with at least a portion of the adjacent photograph may include, for example, stabilizing 116 the digital photographs based on a common feature in the photographs. For example, as shown in FIG. 3, each of digital photographs 150-160 may include subject 162 and background object 164. Stabilizing 116 the digital photographs during navigation of the flipbook media item may include aligning an aspect of each photograph, for example, subject 162 or background object 164, relative to the adjacent photographs. As such, for example if flipbook process 10 aligns the plurality of digital photographs to stabilize subject 162, subject 162 may generally appear in the same relative position (e.g., subject 162 may remain generally static) within a viewing frame of flipbook media item (and/or user interface 200) during navigation of digital photographs 150-160 included within flipbook media item 202, while background object may appear in different relative positions. In a generally corresponding manner, if flipbook process 10 aligns 114 photographs 150-160 by stabilizing 116 background object 164 during navigation of digital photographs 150-160 included within flipbook media item 202, background object 164 may generally appear in the same relative position (e.g., may appear generally static) within the viewing frame of flipbook media item 202 (and/or user interface 200), while subject 162 may appear to move (e.g., may be located in a different relative position). Other embodiments may be equally utilized.

Aligning 114 at least a portion of the first photograph with at least a portion of the adjacent photograph may include cropping 118 one or more of the first photograph and the second photograph during navigation between the first photograph and the adjacent photograph within the flipbook media item. For example, and in a generally similar manner as described above, the various digital photographs may be positioned, cropped, resized, or otherwise arranged within the viewing frame of flipbook media item 202 (and/or user interface 200) such that all common features between two adjacent photographs (e.g., one photograph following the other in sequence) may be aligned or positioned in a common location on a display. In such a manner, it may be easier for a user to appreciate the differences between the photographs. For example, as the user navigates through the photographs within the flipbook, the background, etc., may appear static (even if slightly different camera positions were utilized) with only the subject changing. In some embodiments, the alignment of adjacent photographs may provide visual cues as to how the photographs relate to one another (e.g., a burst of photographs may have been taken to represent a panoramic view or to depict a scene that is larger than a field of view of the camera). As such, even though one single aspect of all of the digital photographs may not appear static, common features between immediately adjacent photographs may appear in the same location.

In another embodiment, in addition/as an alternative to cropping and aligning adjacent photographs, two adjacent photographs may be animated to align the photographs in lockstep. For example, a first photograph may be displayed generally centered in the display. A second, adjacent, photograph may be initially displayed such that one or more features of the second photograph may be aligned with corresponding features of the first photograph, which may result in the second photograph being displayed in an offset position relative to the center of the display (e.g., assuming the features of the second photograph and the corresponding features of the first photograph are not commonly positioned in each respective photograph). After initially displaying the second photograph in an offset position in the display, flipbook process 10 may move the second photograph via an animated movement of the second photograph, such that at the end of the animated movement the second photograph may be generally centered in the display. Further, in an embodiment, the animated movement of the second photograph may be augmented with fade-in and fade-out effects. For example, the second photograph may be initially displayed aligned with the first photograph, with the second photograph being displayed in a fade-in effect while the first photograph is displayed with a fade-out effect. The animated movement of the second photograph toward the center of the display may occur after completion of the fade-in/fade-out effects and/or may occur during the course of the fade-in/fade-out effects. In some embodiments, the effect implemented by flipbook process 10 for aligning adjacent photographs (e.g., aligning and cropping, animated movement of the second photograph toward the center of the display, etc.) may be based on, at least in part, the degree of overlap (e.g., common features) between the first photograph and the second photograph. For example, flipbook process 10 may align 114 the first photograph and the second photograph using cropping effects if the overlap between the first and second photographs is relatively large. Further, flipbook process 10 may align 114 the first photograph and the second photograph using an animated movement of the second photograph toward the center of the display if the overlap between the first photograph and the second photograph is relatively small. Other embodiments will be appreciated.

In an embodiment, flipbook process 10 may facilitate sharing the group of photographs with other users by sharing the flipbook media item, rather than sharing the plurality of digital photographs in the form of separate individual pictures. For example, the flipbook media item may be shared as a single item, and may contain the entire group of photographs. In an embodiment, a user (e.g., user 40) may share flipbook media item 202 by selecting share control 260 from interactive controls 250. Further, in some embodiments, user 40 may share flipbook media item 202 as an attachment to an email, instant message, a shared online photo-resources, or other suitable mechanism by which files may be shared amongst users.

A recipient may view as few, or as many, of the group of photographs included within the flipbook as the desire (e.g., via the interactive navigation controls that may be included as an aspect of the flipbook media item), without being overwhelmed with a groups of very similar photographs. In some embodiments, flipbook process 10 may enable the recipient to designate a different representative photograph of the flipbook media item (e.g., as compared to the representative photograph associated with the flipbook media item when the flipbook media item was transmitted or otherwise shared). In one example, designating a different representative photograph of the flipbook may include a change in metadata associated with the flipbook, rather than a substantive change in the content of the flipbook. The recipient may further share (including back to the originator) the flipbook having the changed representative photograph.

Figure 6:
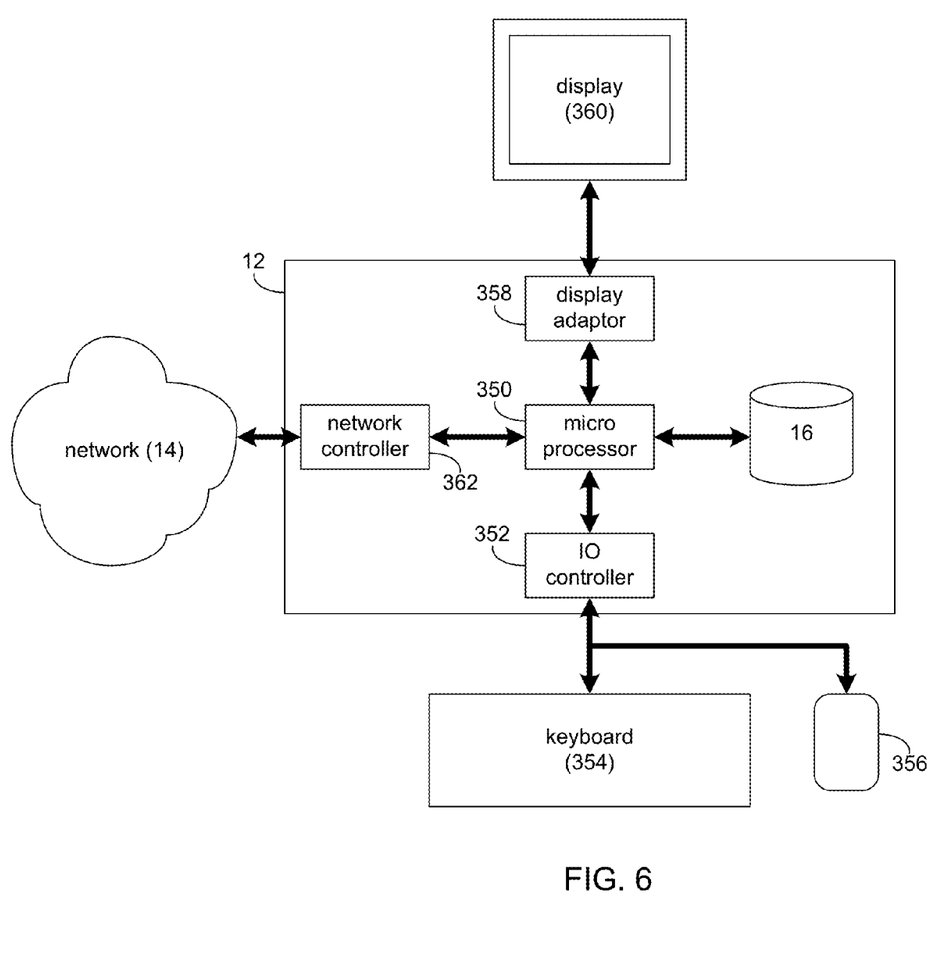
FIG. 6 is a diagrammatic view of the computing device of FIG. 1, according to an embodiment of the present disclosure.

Referring also to FIG. 6, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, flipbook process 10 may be substituted for computing device 12 within FIG. 4, examples of which may include but are not limited to client electronic devices 28, 30, 32, 34.

Computing system 12 may include microprocessor 350 configured to e.g., process data and execute instructions/code for flipbook process 10. Microprocessor 350 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 352 may be configured to couple microprocessor 350 with various devices, such as keyboard 354, mouse 356, USB ports (not shown), and printer ports (not shown). Display adaptor 358 may be configured to couple display 360 (e.g., a CRT or LCD monitor) with microprocessor 350, while network adapter 362 (e.g., an Ethernet adapter) may be configured to couple microprocessor 350 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 350) of a general purpose computer/special purpose computer/other programmable data processing apparatus (e.g., computing device 12), such that the instructions, which execute via the processor (e.g., processor 350) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   identifying, by a computing device, a plurality of photographs as including a common characteristic and having an image quality above a threshold image quality;
   performing image analysis on the plurality of photographs, by the computing device, to determine one or more variations in the plurality of photographs;
   determining, by the computing device, a sequence of the plurality of photographs that creates minimum transformation of at least one of the one or more variations in adjacent photographs;
   generating, by the computing device, a flipbook media item including the plurality of photographs arranged in the determined sequence;
   associating, by the computing device, a representative photograph selected among the plurality of photographs as having a highest relative quality, with a visual indicator of the flipbook media item; and
   associating, by the computing device, one or more interactive control features with the flipbook media item for manually navigating the plurality of photographs.

2. A computer-implemented method comprising:
   identifying, by a computing device, a plurality of photographs as including a common characteristic;
   performing image analysis on the plurality of photographs, by the computing device, to determine one or more variations in the plurality of photographs;
   determining, by the computing device, a sequence of the plurality of photographs that creates minimum transformation of at least one of the one or more variations in adjacent photographs;
   generating, by the computing device, a media item including the plurality of photographs arranged in the determined sequence; and
   associating, by the computing device, one or more interactive control features with the media item.

3. The computer-implemented method of claim 2, wherein the common characteristic includes inclusion of the plurality of photographs in a photo burst.

4. The computer-implemented method of claim 2, wherein the common characteristic includes a visual similarity between the plurality of photographs.

5. The computer-implemented method of claim 2, wherein generating the media item includes associating one of the plurality of photographs as a representative photograph displayed in a visual indicator of the media item.

6. The computer-implemented method of claim 5, further including receiving a user indication of a photograph, and associating the one of the plurality of photographs as the representative photograph based on the user indication.

7. The computer-implemented method of claim 2, wherein the one or more interactive control features include controls for one or more of automatically and manually navigating the plurality of photographs included within the media item.

8. The computer-implement method of claim 2, further including identifying a common feature of a first photograph and an adjacent photograph and aligning the common feature of the first photograph of the plurality of photographs with the common feature of the adjacent photograph of the plurality of photographs during navigation between the first photograph and the adjacent photograph within the media item.

9. The computer-implemented method of claim 8, wherein aligning the common feature of the first photograph with the common feature of the adjacent photograph includes image stabilizing the adjacent photograph with respect to the first photograph.

10. The computer-implemented method of claim 8, wherein aligning the common feature of the first photograph with the common feature of the adjacent photograph includes cropping one or more of the first photograph and the adjacent photograph during navigation between the first photograph and the adjacent photograph within the media item.

11. The computer-implemented method of claim 2, wherein the plurality of photographs has an image quality above a threshold image quality.

12. A computing system comprising at least one processor, the at least one processor configured to:
   identify a plurality of photographs as including a common characteristic;
   perform image analysis on the plurality of photographs to determine one or more variations in the plurality of photographs;
   determine a sequence of the plurality of photographs that creates minimum transformation of at least one of the one or more variations in adjacent photographs;
   generate a media item including the plurality of photographs arranged in the determined order; and
   associate one or more interactive control features with the media item.

13. The computing system of claim 12, wherein the common characteristic includes inclusion of the plurality of photographs in a photo burst.

14. The computing system of claim 12, wherein the common characteristic includes a visual similarity between the plurality of photographs.

15. The computing system of claim 12, wherein the at least one processor configured to generate the media item is configured to associate one of the plurality of photographs as a representative photograph displayed in a visual indicator of the media item.

16. The computing system of claim 15, wherein the at least one processor is further configured to receive a user indication of a photograph, and to associate the one of the plurality of photographs as the representative photograph based on the user indication.

17. The computing system of claim 12, wherein the one or more interactive control features include controls for one or more of automatically and manually navigating the plurality of photographs included within the media item.

18. The computing system of claim 12, wherein the at least one processor is further configured to identify a common feature of a first photograph and an adjacent photograph and to align the common feature of the first photograph of the plurality of photographs with the common feature of the adjacent photograph of the plurality of photographs during navigation between the first photograph and the adjacent photograph within the media item.

19. The computing system of claim 18, wherein the at least one processor configured to align the common feature of the first photograph with the common feature of the adjacent photograph is configured to image stabilize the adjacent photograph with respect to the first photograph.

20. The computing system of claim 18, wherein the at least one processor configured to align the common feature of the first photograph with the common feature of the adjacent photograph is configured to crop one or more of the first photograph and the adjacent photograph during navigation between the first photograph and the adjacent photograph within the media item.

* * * * *